(12) United States Patent
Fitzpatrick et al.

(10) Patent No.: US 8,081,412 B2
(45) Date of Patent: Dec. 20, 2011

(54) FREQUENCY TRANSLATION MODULE PROTECTION CIRCUIT

(75) Inventors: John James Fitzpatrick, Indianapolis, IN (US); Lincheng Xiu, Carmel, IN (US)

(73) Assignee: Thomson Licensing, Boulogne-Billcourt (FR)

( * ) Notice: Subject to any disclaimer, the term of this patent is extended or adjusted under 35 U.S.C. 154(b) by 50 days.

(21) Appl. No.: 12/449,077

(22) PCT Filed: Jan. 25, 2007

(86) PCT No.: PCT/US2007/001889
§ 371 (c)(1),
(2), (4) Date: Jul. 22, 2009

(87) PCT Pub. No.: WO2008/091254
PCT Pub. Date: Jul. 31, 2008

(65) Prior Publication Data
US 2010/0103580 A1    Apr. 29, 2010

(51) Int. Cl.
*H02H 9/00* (2006.01)
(52) U.S. Cl. .......................................... 361/118; 361/56
(58) Field of Classification Search ............... 361/56, 361/117–119
See application file for complete search history.

(56) References Cited

U.S. PATENT DOCUMENTS

| | | | | |
|---|---|---|---|---|
| 3,624,449 A | * | 11/1971 | Morgan | 361/55 |
| 6,195,245 B1 | | 2/2001 | Kobsa | |
| 7,054,127 B1 | * | 5/2006 | Scearce et al. | 361/119 |
| 2002/0056134 A1 | | 5/2002 | Abe et al. | |
| 2008/0094766 A1 | * | 4/2008 | Casey | 361/56 |

FOREIGN PATENT DOCUMENTS

| | | |
|---|---|---|
| DE | 1488913 | 10/1969 |
| EP | 0193989 | 9/1986 |
| EP | 0490788 | 6/1992 |
| GB | 2200069 | 7/1988 |
| JP | 63174735 | 11/1988 |
| JP | 55130548 | 10/1989 |
| JP | 5062150 | 3/1993 |
| JP | 2002016524 | 1/2002 |

OTHER PUBLICATIONS

International Search Report, dated May 25, 2007.

* cited by examiner

*Primary Examiner* — Danny Nguyen
(74) *Attorney, Agent, or Firm* — Robert D. Shedd; Joseph I. Opalach; Brian J. Cromarty (57) ABSTRACT

An architecture for protecting circuitry used for signal communications between a frequency translation module and a decoder from transient voltage surges. According to an exemplary embodiment, the apparatus comprises a first signal path between a transmission line and a first reference potential for conducting negative voltage surges between said transmission line and said first reference potential, comprising a first diode and a first clamping diode, wherein a second reference potential is coupled to a junction of the first diode and the first clamping diode, and a second signal path between the transmission line and the first reference potential, comprising a second diode and a second clamping diode for conducting positive voltage surges between said transmission line and said first reference potential, wherein a second reference potential is coupled to a junction of the second diode and the second clamping diode.

8 Claims, 5 Drawing Sheets

FREQUENCY TRANSLATION MODULE PROTECTION CIRCUIT

This application claims the benefit, under 35 U.S.C. §365 of International Application PCT/US2007/001889 filed Jan. 25, 2007, which was published in accordance with PCT Article 21(2) on Jul. 31, 2008 in English.

BACKGROUND OF THE INVENTION

1. Field of the Invention

The present invention generally relates to signal communications, and more particularly, to an architecture for protecting electronic circuitry used for communications between a frequency translation apparatus, which may be referred to herein as a frequency translation module (FTM), and an integrated receiver-decoder (IRD) or between a low noise block (LNB) and an IRD from voltage surge.

2. Background Information

In a satellite broadcast system, one or more satellites receive signals including audio and/or video signals from one or more earth-based transmitters. The satellite(s) amplify and rebroadcast these signals to signal receiving equipment at the dwellings of consumers via transponders that operate at specified frequencies and have prescribed bandwidths. Such a system includes an uplink transmitting portion (i.e., earth to satellite(s)), an earth-orbiting satellite receiving and transmitting portion, and a downlink portion (i.e., satellite(s) to earth).

In dwellings that receive signals from a satellite broadcast system, signal receiving equipment may be used to frequency shift the entire broadcast spectrum of the satellite(s), and frequency stack the resultant output onto a single coaxial cable. However, as the number of satellites within a satellite broadcast system increases, and with the proliferation of high definition satellite channels, a point will be reached where the total bandwidth required to accommodate all of the satellites will exceed the transmission capability of the coaxial cable. It has become necessary for the satellite decoder industry to implement more satellite slots into their distribution systems. To provide for the increased number of satellite slot transmissions a more elaborate means for satellite configurations selection is required. The two primary methods, used now for selecting these various configurations are the legacy LNB power supply method and the new Frequency Translation Module (FTM) method.

The legacy LNB power supply method controls satellite RF tone on or off selection by voltage level and a superimposed, 600 mvp-p, 22 kHz tone. Tone selection is accomplished by either a constant tone or a Pulse Width Modulated (PWM) tone. The industry standard for the PWM tone is called DiSEqC and is defined in the Eutelsat DiSEqC Bus Functional Specification. The two stage, output voltage (13 or 18 volts) is typically used to select the polarity of incoming satellite signals and the tone selects various satellite slots in space.

The second method (FTM) is self powered, therefore, it does not require an LNB power supply, and uses a UART controlled 2.3 MHz, Frequency Shift Key (FSK) modulation scheme to communicate selection commands to the satellite configuration switch. Other modulation methods may be substituted for the UART modulation method. The FTM switch is designed to select a satellite signal transponder from a host of satellite receiver antennas and translate it, in frequency, to a single transponder. This new frequency shifted transponder band is then sent to the satellite decoder box through the connecting coax cable.

Present day satellite decoder systems need the ability to switch between these two communication methods and operate in either mode without being disturbed by the other system. If a satellite receiver system is capable of FTM operation, the conventional LNB power supply will be disabled such that all control and selection of the available satellite signals is done with the modulated 2.3 MHz, FTM communication channel. However, a problem presented by this multiband configuration is the inability of conventional lighting surge protection circuits to coexisting with the DC voltage and 22 kHz DiSEqC signal as well as the high amplitude 2.3 MHz FTM carrier signal and 900 MHz broadcast satellite signals without distorting any of these waveforms. Previous single transient voltage suppression diode protection scheme, used in legacy Set Top Boxes, distort the 2.3 MHz signal by becoming forward biased during portions of the 2.3 MHz wave period.

Furthermore, the absence of the LNB DC supply voltage on the transmission line reduced the amount of negative voltage required to forward bias protection diode. Under these previous conditions, the FTM signal could forward bias the protection diode when the 2.3 MHz signal is in its negative phase. There exists a need for a FTM and IRD protection circuit that can protect the circuitry from voltage and current surge without distorting the waveforms transmitted on the transmission line. The present invention described herein addresses this and/or other problems.

SUMMARY OF THE INVENTION

In accordance with an aspect of the present invention, an apparatus for protecting frequency translation module and/or receiver decoder circuitry from voltage surge is disclosed. According to an exemplary embodiment, the apparatus comprises a first signal path between a transmission line and a first reference potential, comprising a first diode and a first clamping diode, wherein a second reference potential is coupled to a junction of the first diode and the first clamping diode, and a second signal path between the transmission line and the first reference potential, comprising a second diode and a second clamping diode, wherein a second reference potential is coupled to a junction of the second diode and the second clamping diode.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
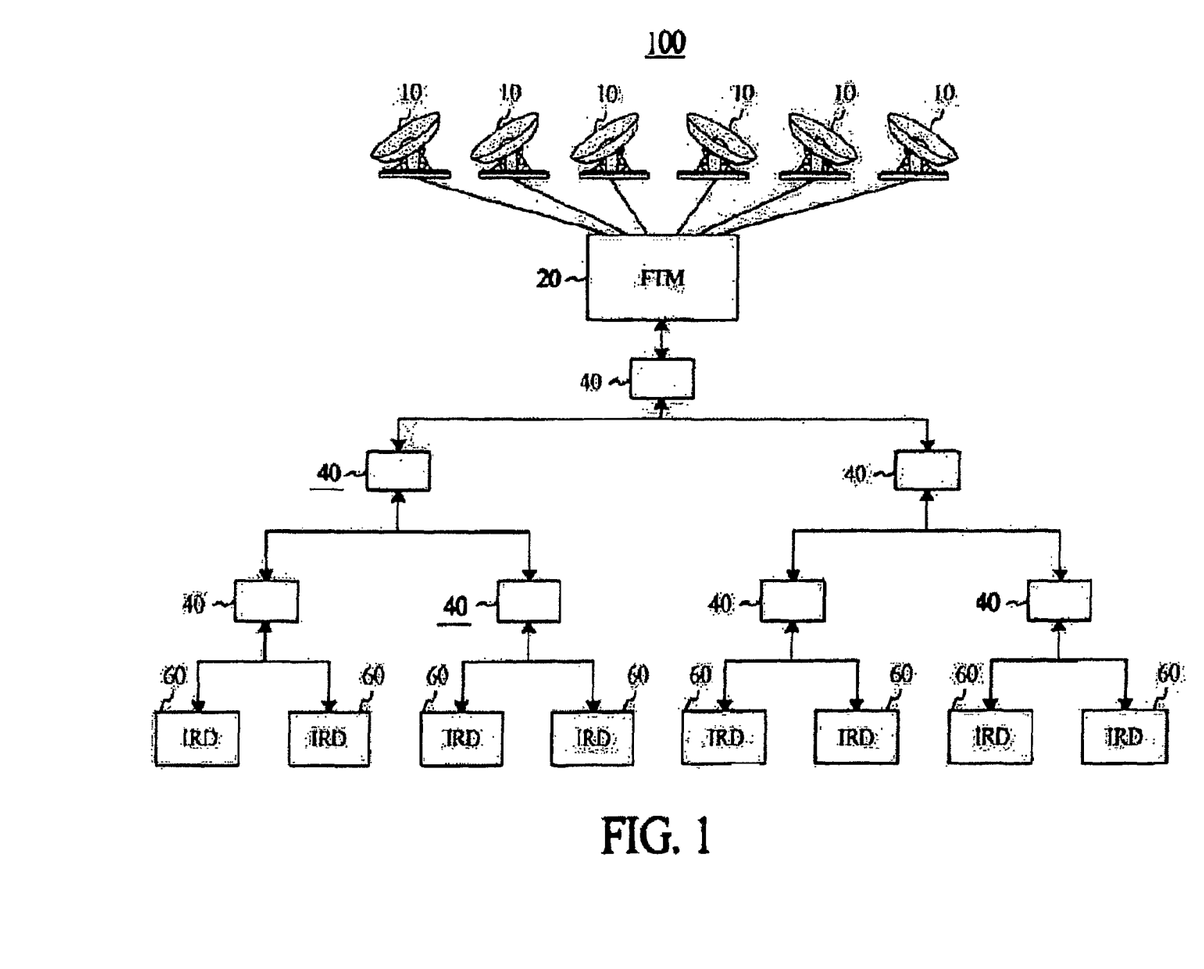
FIG. 1 is a diagram showing an exemplary environment for implementing the present invention.

Referring now to the drawings, and more particularly to FIG. 1, a diagram of an exemplary environment 100 for implementing the present invention is shown. Environment 100 of FIG. 1 comprises a plurality of signal receiving means such as signal receiving elements 10, such as antennas or portions of an antenna or transmission line inputs or low noise block amplifier any other means for receiving an information bearing signal, frequency translating means such as FTM 20, a plurality of signal splitting means such as signal splitters 40, and a plurality of signal receiving and decoding means such as IRDs 60. The signal receiving elements 10 may be operative to shift the frequency of received signals to frequencies more conducive to transmission via transmission lines such as coaxial cables. For example, a low noise block amplifier used in satellite television signal reception may be operative to frequency shift the received signal from around 12 GHz to 1 GHz, or from "Ka" band to "L" band. According to an exemplary embodiment described herein, the aforementioned elements of environment 100 are operatively coupled to one another via a transmission medium such as coaxial cable, although other types of transmission mediums may also be used according to the present invention. Environment 100 may for example represent a signal communication network within a given household and/or business dwelling.

Signal receiving elements 10 are each operative to receive signals including audio, video, and/or data signals (e.g., television signal, etc.) froth one or more signal sources, such as a satellite broadcast system and/or other type of signal broadcast system. According to an exemplary embodiment, signal receiving element 10 is embodied as an antenna such as a satellite receiving dish, but may also be embodied as any type of signal receiving element.

FTM 20 is operative to receive signals including audio, video, and/or data signals (e.g., television signals, etc.) from signal receiving elements 10, and process the received signals using functions including signal tuning and frequency translation functions to generate corresponding output signals that are provided to IRDs 60 via coaxial cable and signal splitters 40. According to an exemplary embodiment, FTM 20 may communicate with up to 12 IRDs 60 within a single dwelling. For purposes of example and explanation, however, FIG. 1 show FTM 20 connected to 8 IRDs 60 using simple two-way signal splitters 40. Further exemplary details regarding FTM 20, and its ability to communicate with IRDs 60 will be provided later herein.

Signal splitters 40 are each operative to perform a signal splitting and/or repeating function. According to an exemplary embodiment, signal splitters 40 are each operative to perform a 2-way signal splitting function to facilitate signal communication between FTM 20 and IRDs 60.

IRDs 60 are each operative to perform various signal receiving and processing functions including signal tuning, demodulation and decoding functions. According to an exemplary embodiment, each IRD 60 is operative to tune, demodulate and decode signals provided from FTM 20 via signal spatters 40, and enable aural and/or visual outputs corresponding to the received signals. As will be described later herein, such signals are provided from FTM 20 to IRDs 60 responsive to request commands from IRDs 60, and such request commands may each represent a request for a desired band of television signals. With a satellite broadcast system, each request command may for example indicate a desired satellite and/or a desired transponder. The request commands may be generated by IRDs 60 responsive to user inputs (e.g., via remote control devices, etc.).

According to an exemplary embodiment, each IRD 60 also includes an associated audio and/or video output device such as a standard-definition (SD) and/or high-definition (HD) display device. Such display device may be integrated or non-integrated. Accordingly, each IRD 60 may be embodied as a device such as a television set, computer or monitor that includes an integrated display device, or a device such as a set-top box, video cassette recorder (VCR), digital versatile disk (DVD) player, video game box, personal video recorders (PVR), computer or other device that may not include an integrated display device.

Figure 2:
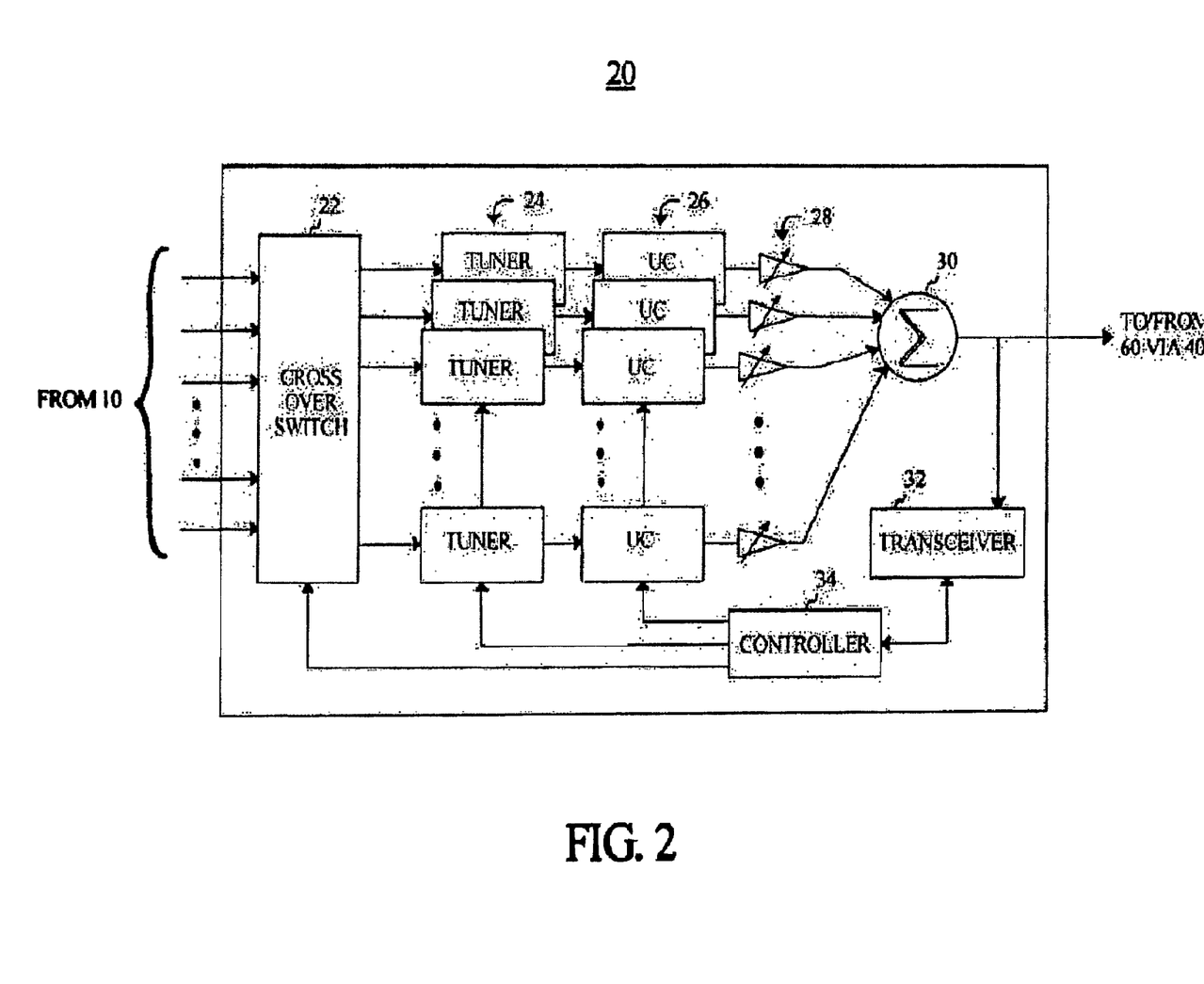
FIG. 2 is a block diagram showing further details of the FTM of FIG. 1 according to an exemplary embodiment of the present invention.

Referring to FIG. 2, a block diagram providing further details of FTM 20 of FIG. 1 according to an exemplary embodiment of the present invention is shown. FTM of FIG. 2 comprises switching means such as cross over switch 22, a plurality of tuning means such as tuners 24, a plurality of frequency converting means such as frequency up converters (UCs) 26, a plurality of amplifying means such as variable gain amplifiers 28, signal combining means such as signal combiner 30, transceiving means such as transceiver 32, and control means such as controller 34. The foregoing elements of FTM 20 may be implemented using integrated circuits (ICs), and one or more elements may be included on a given IC. Moreover, a given element may be included on more than one IC. For clarity of description, certain conventional elements associated with FTM 20 such as certain control signals, power signals and/or other elements may not be shown in FIG. 2.

Cross over switch 22 is operative to receive a plurality of input signals from signal receiving elements 10. According to an exemplary embodiment, such input signals represent various bands of radio frequency (RF) television signals. With a satellite broadcast system, such input signals may for example represent L-band signals, and cross over switch 22 may include an input for each signal polarization used within the system. Also according to an exemplary embodiment, cross over switch 22 selectively passes the RF signals from its inputs to specific designated tuners 24 responsive to control signals from controller 34.

Tuners 24 are each operative to perform a signal tuning function responsive to a control signal from controller 34. According to an exemplary embodiment, each tuner 24 receives an RF signal from cross over switch 22, and performs the signal tuning function by filtering and frequency down converting (i.e., single or multiple stage down conversion) the RF signal to thereby generate an intermediate frequency (IF) signal. The RF and IF signals may include audio, video and/or data content (e.g., television signals, etc.), and may be of an analog signal standard (e.g., NTSC, PAL, SECAM, etc.) and/or a digital signal standard (e.g., ATSC, QAM, QPSK, etc.). The number of tuners 24 included in FTM 20 is a matter of design choice.

Frequency up converters (UCs) 26 are each operative to perform a frequency translation function. According to an exemplary embodiment, each frequency up converter (UC) 26 includes a mixing element and a local oscillator (not shown in FIGS.) that frequency up converts an IF signal provided froth a corresponding tuner 24 to a designated frequency band responsive to a control signal from controller 34 to thereby generate a frequency up converted signal.

Variable gain amplifiers 28 are each operative to perform a signal amplification function. According to an exemplary embodiment, each variable gain amplifiers 28 is operative to amplify a frequency converted signal output from a corresponding frequency up converter (UC) 26 to thereby generate an amplified signal. Although not expressly shown in FIG. 2, the gain of each variable gain amplifier 28 may be controlled via a control signal from controller 34.

Signal combiner 30 is operative to perform a signal combining (i.e., summing) function. According to an exemplary embodiment, signal combiner 30 combines the amplified signals provided from variable gain amplifiers 28 and outputs the resultant signals onto a transmission medium such as coaxial cable for transmission to one or more IRDs 60 via signal splitters 40.

Transceiver 32 is operative to enable communications between FTM 20 and IRDs 60. According to an exemplary embodiment, transceiver 32 receives various signals from IRDs 60 and relays those signals to controller 34. Conversely, transceiver 32 receives signals from controller 34 and relays those signals to one or more IRDs 60 via signal splitters 40. Transceiver 32 may for example be operative to receive and transmit signals in one or more predefined frequency bands. For example, communications may be made by RF signal in a low frequency band, such as 2.3 MHz, with UART modulation scheme.

Controller 34 is operative to perform various control functions. According to an exemplary embodiment, controller 34 receives request commands for desired bands of television signals from IRDs 60. As will be described later herein, each IRD 60 may transmit its request command to FTM 20 during a separate time slot that is assigned by controller 34. With a satellite broadcast system, a request command may indicate a desired satellite and/or a desired transponder that provides a desired band of television signals. Controller 34 enables signals corresponding to the desired bands of television signals to be transmitted to corresponding IRDs 60 responsive to the request commands.

According to an exemplary embodiment, controller 34 provides various control signals to cross over switch 22, tuners 24, and frequency up converters (UCs) 26 that cause the signals corresponding to the desired bands of television signals to be transmitted to IRDs 60 via a transmission medium such as coaxial cable. Controller 34 also provides acknowledgement responses to IRDs 60 responsive to the request commands which indicate the frequency bands (e.g., on the coaxial cable, etc.) that will be used to transmit the signals corresponding to the desired bands of television signals to IRDs 60. In this manner, controller 34 may allocate the available frequency spectrum of the transmission medium (e.g., coaxial cable, etc.) so that all IRDs 60 can receive desired signals simultaneously.

Figure 3:
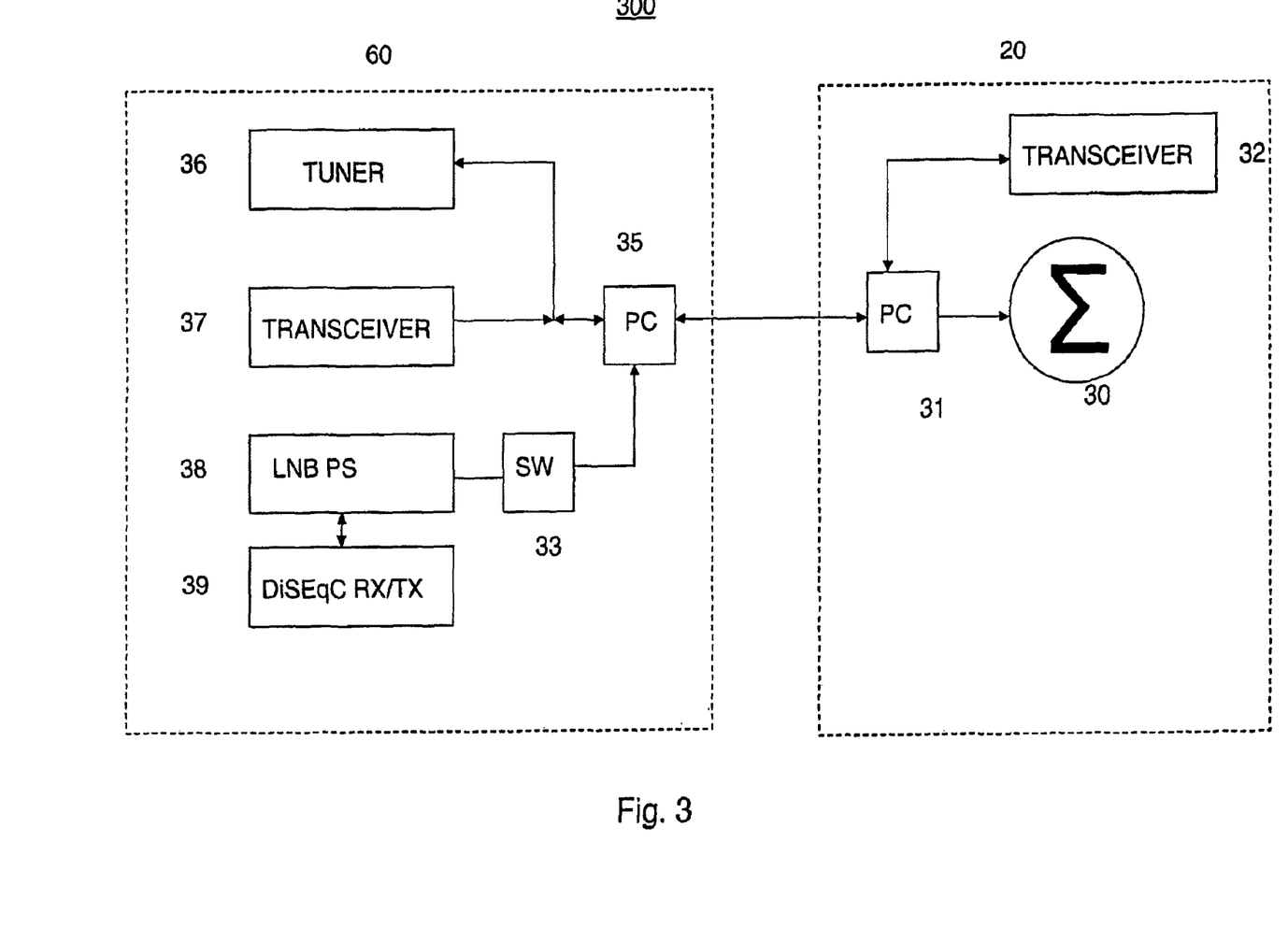
FIG. 3 is a diagram showing further details of the LNB and IRD LNB control transceivers according to an exemplary embodiment of the present invention.

Referring to FIG. 3, shows a diagram of an exemplary environment 300 for implementing the present invention is shown showing further details of the interconnectivity between the FTM 20 and IRD 60 of FIG. 1. Environment 300 of FIG. 3 comprises a protection circuit 31, a transceiver 32, and a signal combiner 30 within the FTM 20. Within the IRD 60, a tuner 36, a transceiver 37, an LNB power supply 38, a DiSEqC encoder/decoder 39, a switch 33, and a protection circuit 35.

Protection circuit 31 is operative to pass desired signals, such as 22 kHz tone on DC voltage, FTM control signals, and television signals without distortion while protecting the FTM circuitry from lightning surge and other environmental electrical disturbances. According to an exemplary embodiment, protection circuit 31 comprises surge protection diodes implemented to absorb energy from positive and negative lightning surge events. The surge protection diodes are configured not to present a non-linear conduction path to the 2.3 MHz FTM signal.

Signal combiner 30 is operative to perform a signal combining (i.e., summing) function. According to an exemplary embodiment, signal combiner 30 combines the amplified signals provided from variable gain amplifiers 28 and outputs the resultant signals onto a transmission medium such as coaxial cable for transmission to one or more IRDs 60 via signal splitters 40.

Transceiver 32 is operative to enable communications between FTM 20 and IRDs 60. According to an exemplary embodiment, transceiver 32 receives various signals from IRDs 60 and relays those signals to controller 34. Conversely, transceiver 32 receives signals from controller 34 and relays those signals to one or more IRDs 60 via signal splitters 40. Transceiver 32 may for example be operative to receive and transmit signals in one or more predefined frequency bands.

Protection circuit 35 is operative to pass desired signals, such as FTM control signals, 22 kHz DiSEqC signals, and television signals without distortion while protecting the IRD 60 circuitry from lightning surge and other environmental electrical disturbances. According to an exemplary embodiment, protection circuit 35 comprises surge protection diodes implemented to absorb energy from positive and negative lightning surge events. The surge protection diodes are configured not to present a non-linear conduction path to the 2.3 MHz FTM signal or the incoming television signals transmitted from the FTM 20.

Tuner 36 is operative to perform a signal tuning function responsive to a control signal from IRD controller in response to a channel selection from the user. According to an exemplary embodiment, the tuner receives an RF signal via protection circuit 35, and performs the signal tuning function by filtering and frequency down converting (i.e., single or multiple stage down conversion) the RF signal to thereby generate an intermediate frequency (IF) signal. The RF and IF signals may include audio, video and/or data content (e.g., television signals, etc.), and may be of an analog signal standard (e.g., NTSC, PAL, SECAM, etc.) and/or a digital signal standard (e.g., ATSC, QAM, QPSK, etc.).

Transceiver 37 is operative to enable communications between FTM 20 and IRDs 60. According to an exemplary embodiment, transceiver 37 receives various signals from FTM 20 and relays those signals to the IRD controller. Conversely, transceiver 37 receives signals from IRD controller and relays those signals to the FTM via coaxial cable and protection circuits 31 and 35. Transceiver 37 may for example be operative to receive and transmit signals in one or more predefined frequency bands.

The LNB power supply 38 is operative to generate the required operating DC power for the LNBs when the system is operating in Legacy LNB mode. According to an exemplary embodiment, the LNB power supply 38 is a conventional LNB power supply comprising a DC to DC, switching power supply feeding a linear regulator which can superimpose a 22 kHz tone onto the DC output voltage. The LNB power supply has the ability to power down or disable the output. The output of the linear regulator is typically a push-pull type, but can equally be other configurations, such as emitter follower type output.

The switch 33 is operative to couple the LNB power supply 38 to the output transmission line via the protection circuit 35 with a low impedance when the IRD 60 is operating in the Legacy mode. The switch 33 decouples the LNB power supply 38 from the output transition line and optionally, the protection circuit 35, with a high impedance when the IRD 60 is operating in the FTM mode.

The DiSEqC encoder and decoder 39 is operative to modulate the LNB DC voltage with a 22 kHz signal or other required control tones to communicate to the LNBs when the IRD is operating in the Legacy mode. The DiSEqC encoder and decoder 39 is may be further operative to transducer a 22 kHz current pulses to communicate with the LNBs. According to an exemplary embodiment, there are two 22 kHz tone modes, constant tone and two-way pulse width modulated (PWM) tone control mode. When the LNB regulator is transmitting tone, the DiSEqC encoder and decoder 39 provides a low impedance output to the switch 33.

Figure 4:
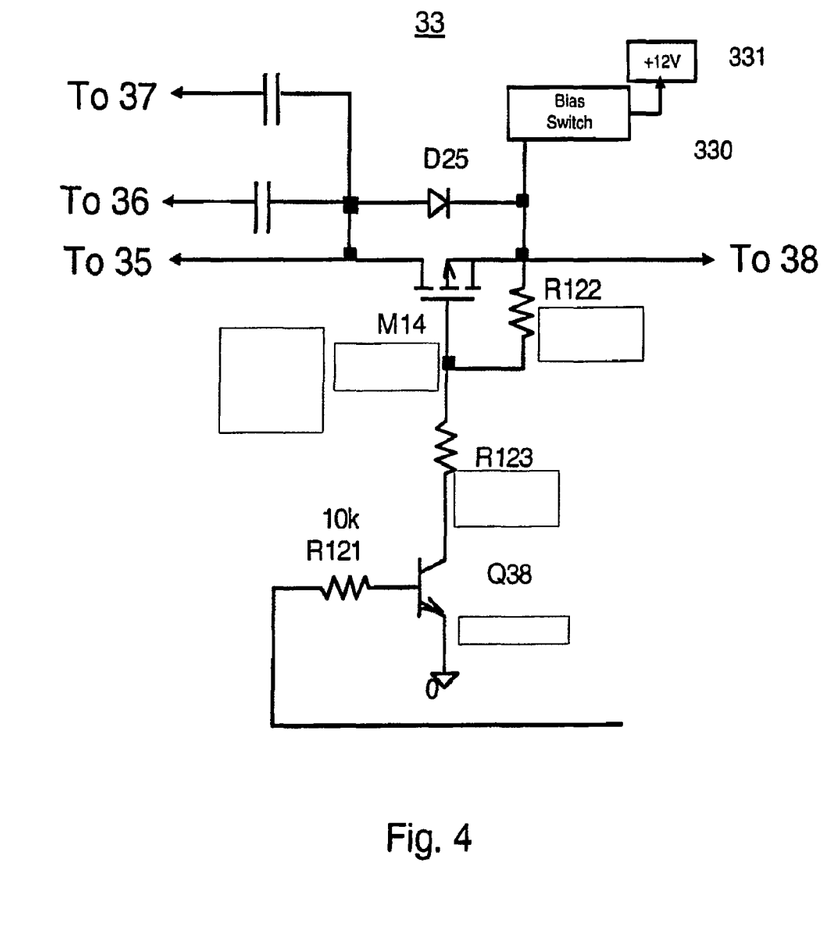
FIG. 4 is a diagram showing further details of the transceiver switching means according to an exemplary embodiment of the present invention.

FIG. 4 is a diagram of an exemplary embodiment for implementing the present invention showing further details the switch 33 of FIG. 3 an its interconnectivity between the protection circuit 35, the tuner 36, transceiver 37, and LNB power supply 38, of FIG. 3. The switch comprises a first resistor R121, a second resistor R122, a third resistor R123, a MOSFET transistor M14, a MOSFET protection diode D25, a bipolar transistor Q38, a bias switch 330 and a positive 12 volt DC supply 331.

The MOSFET transistor M14 is operative to isolate the FTM transceiver 37, the tuner 36, and the protection circuitry 35 from the LNB power supply 38 when the IRD 60 is in the FTM mode of operation. When the IRD 60 is in the Legacy mode of operation, the MOSFET transistor M14 is operative to provide a low impedance coupling between the LNB power supply 38 and the protection circuitry 35. The protection circuitry 35 provides a wideband, low impedance coupling to either the FTM 20 in FTM mode or directly to the LNB during Legacy mode. The ability of the MOSFET transistor M14 to isolate the low impedance of the LNB power supply 38 from the 2.3 MHz FTM network makes the impedance of the LNB supply adaptable. The adaptability is accomplished with the MOSFET transistor M14 biased "On" in the Legacy mode and Biasing "Off" in the FTM mode. MOSFET M14 looks like an open drain to the FTM output node when biased "Off". This MOSFET connects the protection circuit 35 to the low impedance of the LNB voltage source Power Supply 38. When biased "Off", M14 provides a high impedance (open drain) to the transceiver 37. In the FTM mode, transistor Q38 is biased "Off" by setting the base to zero volts. With transistor Q38 biased "off" it functions as an open collector. The third resistor R123 then is selected at a sufficient resistance to bias the gate of MOSFET M14 to the same voltage as the source of MOSFET 14. This makes the drain of MOSFET 14 a high impedance open drain to the transceiver 37. Transistor Q38 is biased by a control voltage (not shown) applied at the base of transistor Q38. This control voltage can be generated by a microprocessor, a control circuit, the bias switch 330 or by the LNB power supply 38. The LNB power supply 38 may be only operational during the Legacy mode of operation and therefore would require MOSFET M14 to be biased "On."

The bias switch 330 and 12 volt DC supply 331 are operative to ensure that the MOSFET 14 is biased off during operation in the FTM mode. To accomplish this bias requirement the bias switch 330 provides 12 volts to the source of the switching MOSFET transistor M14 when the system is in the FTM mode. This accomplishes two goals, it properly biases the MOSFET in the "Off" position and reverse biases the MOSFET protection diode D25. When the LNB power supply output is shutdown, if the source of the MOSFET transistor M14 were also at zero volts, M14 could bias "On" during portions of the 2.3 MHz FTM waveform. The 12 volts on the source/gate of M14 prevents this and MOSFET M14 is no longer capable of being biased "on". MOSFET M14 drain becomes a high impedance. R125 hold Node 15 at the zero voltage level.

Figure 5:
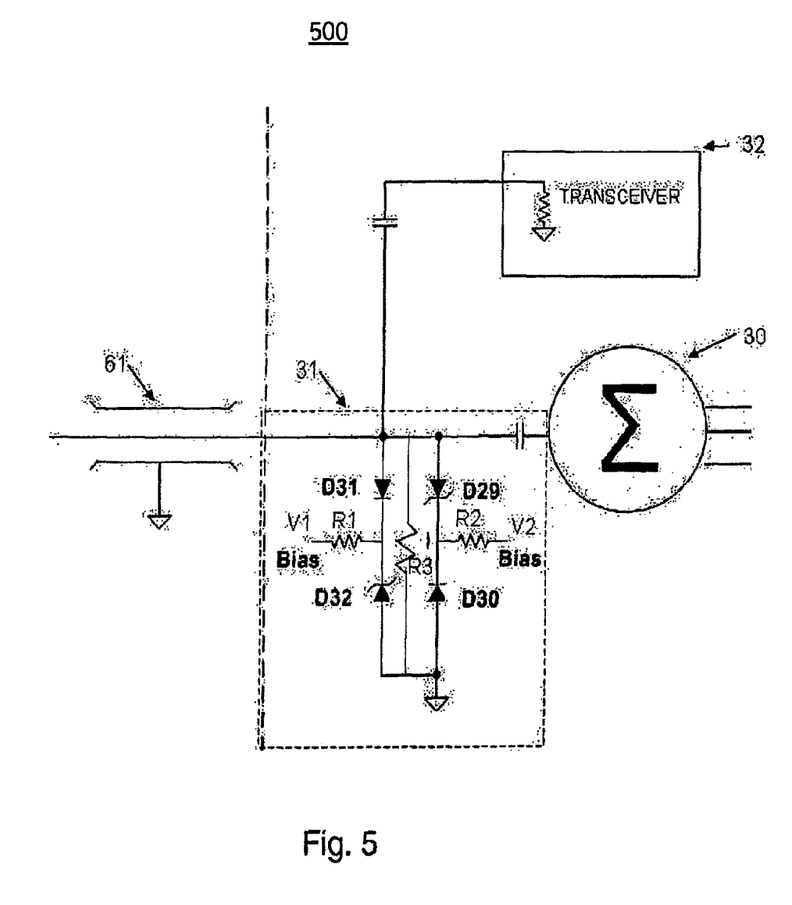
FIG. 5 is a diagram showing further details of a protection circuit according to an exemplary embodiment of the present invention.

FIG. 5 is a diagram of an exemplary embodiment for implementing the present invention in environment 500 showing further details of a protection circuit 31 of FIG. 3 and its interconnectivity between the transceiver 32, the signal combiner 30 of FIG. 3 and the transmission line 61. It should be appreciated that this exemplary embodiment of the protection circuit according to the present invention can equally be implemented within the IRD 60 of FIG. 3, shown as protection circuit 35. The nature of lightning surges makes it necessary to place surge suppression diodes at each end of transmission line 61. This is due to the voltage drop created across the transmission line 61 when high surge currents are flowing through it. The FTM 20 of FIG. 3 side of the transmission line as well as the IRD 60 side of the transmission line have similar configurations of protection diodes.

The protection circuit comprises a first diode D30, a second diode D31 a first transient suppression (TVS) diode D29, a second TVS diode D32, a first resistor R1, a second resistor R2, a third resistor R3, a first bias point V1 and a second bias point V2.

The protection circuit 31 protects the FTM transceiver 32 and other interface circuitry from lightning surge. The diodes D29, D30, D31, D32 are implemented to absorb energy from positive and negative lightning surge events. This configuration has been configured not to present a low impedance or a nonlinear conduction path to the 2.3 MHz FTM signal.

The TVS protection diodes D29, D32 are a source of capacitance and nonlinear conduction conditions to the 2.3 MHz FTM signal transmission line present on the 75 ohm transmission line 61 during FTM mode. The TVS diodes D29, D32 also has a high parasitic capacitance, typically 10 nF, associated with them. According to an exemplary embodiment of the present invention, a conventional bipolar diode D30, D31 is place in series with a TVS diode D29, D32 and reverse biases a bipolar diode D30, D31 to achieve a high impedance series path to the 2.3 MHz FTM signal. When the protection circuit 35 is implemented in the IRD 60 of FIG. 3, the series bipolar diode D25 of FIG. 4, serves the dual purpose of a protection diode for M14 of FIG. 4 and it is the reversed biased series diode to keep the 2.3 MHz FTM signal from forward biasing it or the TVS diodes D29, D32. This method of biasing bipolar diode D25 and the MOSFET M14 of FIG. 4 with bias switch and voltage 330, 331 of FIG. 4, reduce the noise generated by the boost circuit from contaminating the FTM detector. TVS diodes can be implemented using any clamping diode, such as an avalanche or zener diode. These clamping diodes have a deliberate breakdown beyond a known reverse current such that the reverse voltage is "clamped" to a known value, typically called the zener voltage or breakdown voltage. These clamping diodes however have a maximum limit to the current and power in the zener or avalanche region. In the exemplary description of the circuit according to the invention these clamping diodes will generically be referred to as TVS diodes, but any clamping diode as described above can be substituted.

In this exemplary embodiment according to the present invention, the positive surge protection uses a 20 volt TVS diode D32 with a bipolar diode D31 in series with it. This allows the biasing voltage V1 and first resistor R1 to pull the cathodes of these two diodes D31 D32 above the transmission line average zero voltage. This reverse biases them and prevents them from conducting during any portion of the 2.3 MHz FTM waveform.

Negative surge events require a second diode to ground to alleviate negative surge energy. A second low voltage TVS diode D29 is placed in series with a bipolar diode D30. D30 is then reverse biased by biasing voltage V2 so it does not enter conduction when encountering the high amplitude peaks of the 2.3 MHz signal. The bipolar diode D30 is reverse biased by a small voltage, in this exemplary embodiment 3.3 volts, through the second resistor R2.

It is desirable that the transmission line be at zero volts to prevent unwanted DC voltage on the output of the FTM module 20 or the IRD 60. The third resistor R3 holds this node at zero volts. The second TVS diode D29 separates the reverse, bipolar diode bias voltage V2 from the 0v DC, transmission line. The TVS diode D28 can be implemented in the 4 diode protection scheme as seen at the FTM device 20, or associated with the a series bipolar diode in the IRD 60 of FIG. 3. Depending on particular design criteria, V1 can be supplied by the same voltage supply as V2 such that V1 equals V2.

As described herein, the present invention provides an architecture and protocol for enabling signal communications between an FTM and an IRD within a dwelling. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An apparatus comprising:
   a first signal path between a transmission line and a first reference potential, comprising a first diode and a first clamping diode, wherein a first DC voltage is coupled to a junction of the first diode and the first clamping diode, such that said first diode is reverse biased; and
   a second signal path between the transmission line and the first reference potential, comprising a second diode and a second clamping diode, wherein a second DC voltage is coupled to a junction of the second diode and the second clamping diode, such that said second diode is reverse biased.

2. The apparatus of claim 1 wherein the junction of the first diode and the first clamping diode is coupled to a cathode of the first diode and a cathode of the first clamping diode.

3. The apparatus of claim 1 wherein the junction of the second diode and the second clamping diode is coupled to a cathode of the second diode and a cathode of the second clamping diode.

4. The apparatus of claim 1 wherein an anode of the first diode is coupled to the transmission line and an anode of the first clamping diode is coupled to the source of reference potential.

5. The apparatus of claim 1 wherein an anode of the second diode is coupled to the source of reference potential and an anode of the second clamping diode is coupled to the transmission line.

6. The apparatus of claim 1 wherein the first clamping diode and the second clamping diodes are zener diodes.

7. The apparatus of claim 1 wherein the first clamping diode and the second clamping diodes are avalanche diodes.

8. The apparatus of claim 1 wherein the first clamping diode and the second clamping diodes are transient voltage suppression diodes.

* * * * *